United States Patent [19]

Kim

[11] Patent Number: 5,528,300
[45] Date of Patent: Jun. 18, 1996

[54] CODING MODE CONTROL DEVICE FOR DIGITAL VIDEO SIGNAL CODING SYSTEM

[75] Inventor: Jong-Hoon Kim, Seoul, Rep. of Korea

[73] Assignee: Daewoo Electronics Co., Ltd., Seoul, Rep. of Korea

[21] Appl. No.: 294,530

[22] Filed: Aug. 22, 1994

[30] Foreign Application Priority Data

Aug. 20, 1993 [KR] Rep. of Korea ............... 1993-16211

[51] Int. Cl.$^6$ ........................... H04N 7/26; H04N 7/44
[52] U.S. Cl. ........................... 348/415; 348/701
[58] Field of Search ................. 348/410, 397, 348/398, 400, 409, 420, 421, 416, 415, 384, 19, 625, 701, 699, 702, 700, 669, 620, 451, 452, 431; 382/236, 239; H04N 7/44, 7/26

[56] References Cited

U.S. PATENT DOCUMENTS

| | | | |
|---|---|---|---|
| 3,403,226 | 9/1968 | Wintringham | 348/421 |
| 4,689,671 | 8/1987 | Ohki et al. | 358/135 |
| 4,802,006 | 1/1989 | Iinuma et al. | 348/412 |
| 4,837,618 | 6/1989 | Hatori et al. | 348/401 |
| 4,924,306 | 5/1990 | van der Meer et al. | 358/105 |
| 4,942,465 | 7/1990 | Ohta | 348/413 |
| 5,040,060 | 8/1991 | Owada et al. | 348/421 |
| 5,321,725 | 6/1994 | Paik et al. | 348/384 |
| 5,387,938 | 2/1995 | Fukada et al. | 348/420 |
| 5,398,067 | 3/1995 | Sakamota | 348/420 |

FOREIGN PATENT DOCUMENTS

| | | | |
|---|---|---|---|
| 0261917 | 3/1988 | European Pat. Off. | H04N 5/14 |
| 0529196 | 3/1993 | European Pat. Off. | H04N 7/18 |
| 0549471 | 6/1993 | European Pat. Off. | H04N 5/14 |

OTHER PUBLICATIONS

J. S. Kim et al., "Local Motion-Adaptive Interpolation Technique Based on Block Matching Algorithms", Signal Processing Image Communication, vol. 4, No. 6, pp. 519-528 (Nov. 1992), Amsterdam, NL.

M. Achiha et al., "Motion-Adaptive Enhanced Decoder and Up-Converter for PAL signals", 17th International Television Symposium and Technical Exhibition: Broadcast Sessions, pp. 197-208 (Jun. 1991), Montreux, CH.

*Primary Examiner*—Safet Metjahic
*Attorney, Agent, or Firm*—Anderson Kill Olick & Oshinsky

[57] ABSTRACT

An encoding apparatus for coding digital video signals describing a scene having at least one moving object and a stationary background, the digital video signals being represented by a series of video frames, each video frame being divided into a plurality of coding blocks, having a capability of adaptively selecting one of an intra coding technique and a non-intra coding technique to be applied to each coding block, comprises uncovered area detector for, in responsive to a current frame and the previous and next frames thereof in the digital video signals, detecting an uncovered area representing a portion in the current frame, which used to be hidden behind the moving object in the previous frame but becomes visible after a movement of the moving object between the previous and current frames; and coding mode controller for determining, for each of the coding blocks in the current frame, whether the coding block belongs to the uncovered area or not, and applying the intro coding technique to the coding block regardless of the adaptively selected coding mode.

1 Claim, 4 Drawing Sheets

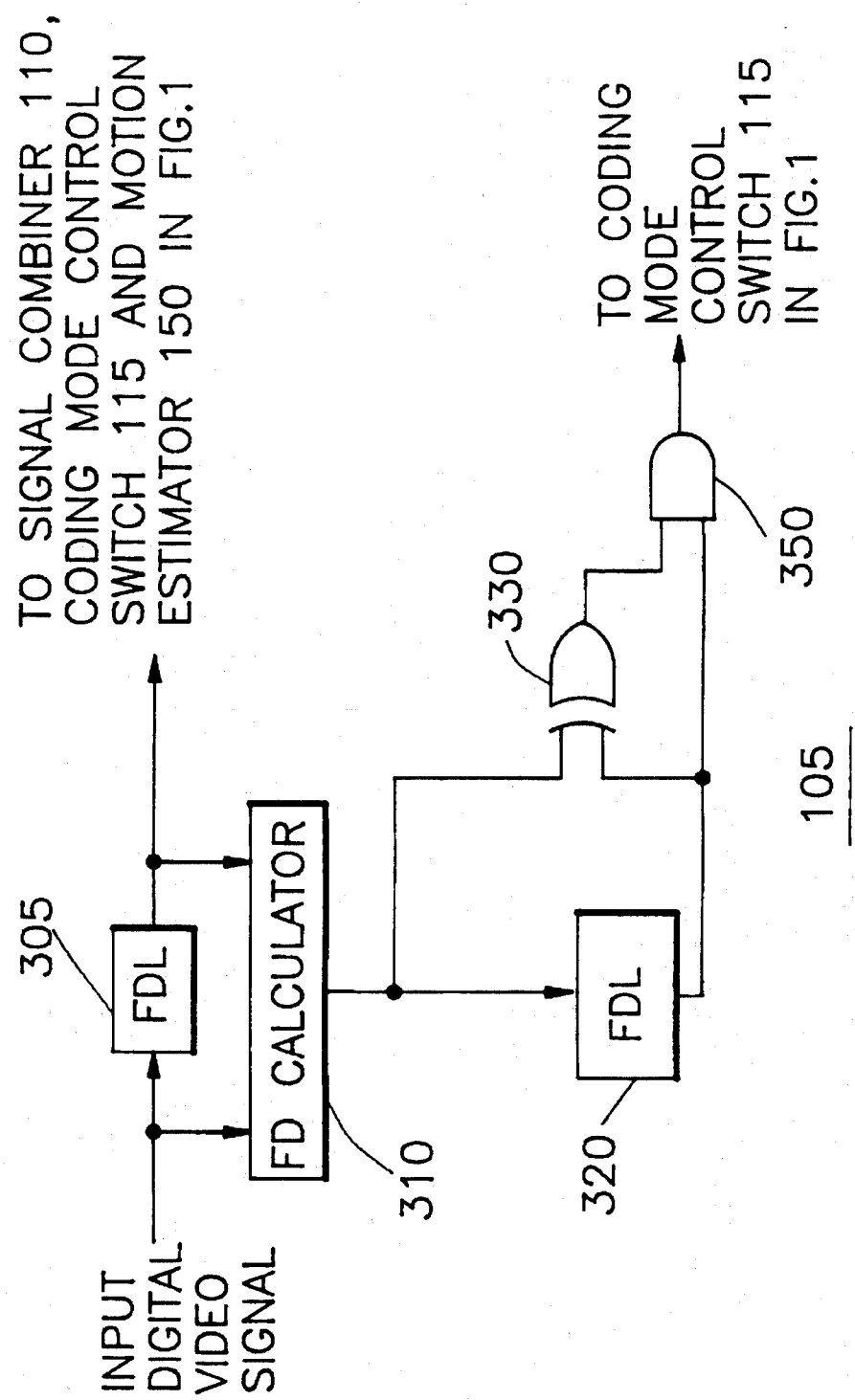

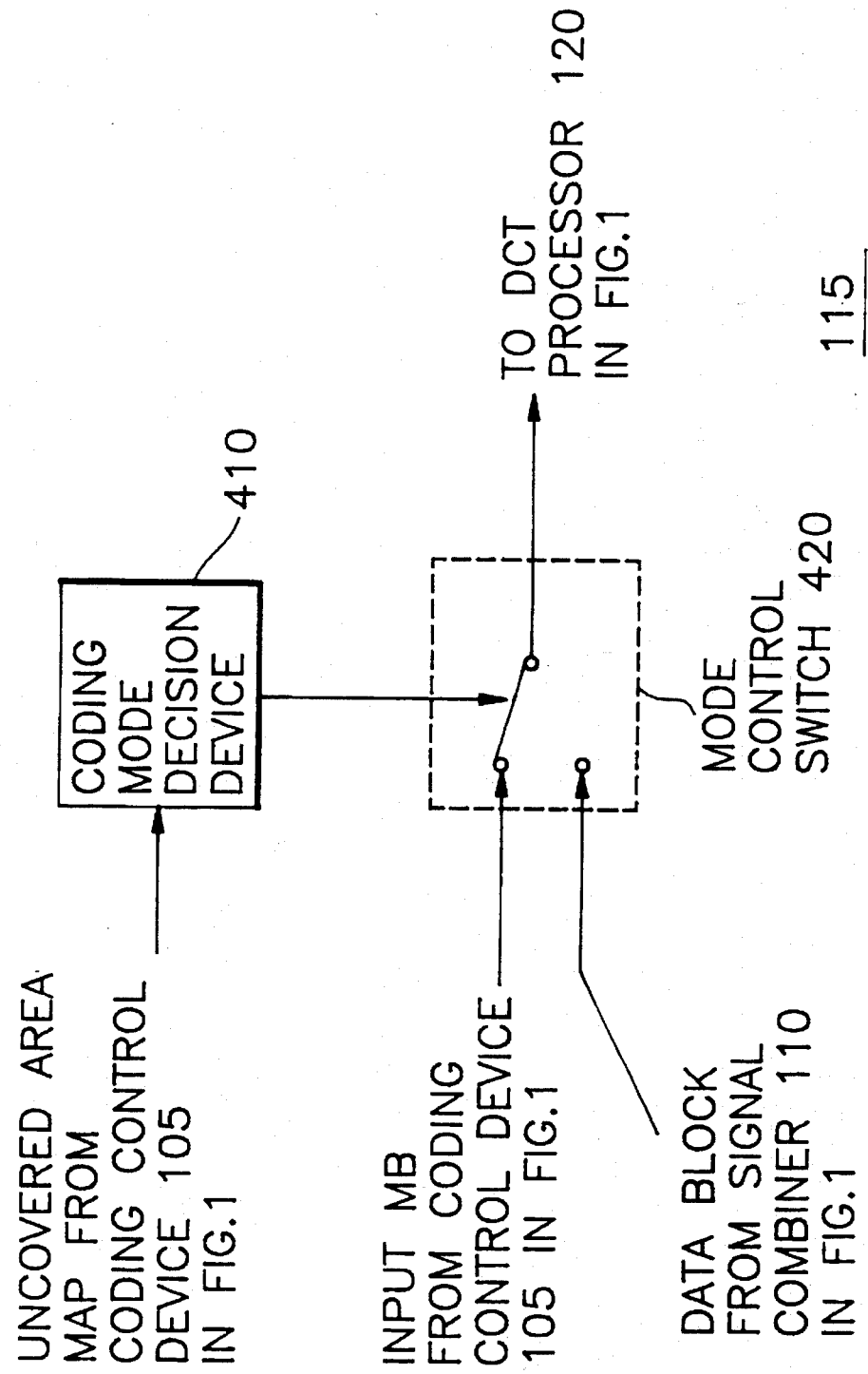

CODING MODE CONTROL DEVICE FOR DIGITAL VIDEO SIGNAL CODING SYSTEM

FIELD OF THE INVENTION

The present invention is related to a digital video signal coding system; and, more particularly, to an encoder comprising a coding mode control device capable of accurately controlling the coding mode of each image data block in digital video signals.

DESCRIPTION OF THE PRIOR ART

In digital video signal coding applications such as high definition television, video conferencing system, video telephone and video door phone, video signals are transmitted in a digitized form. When the video signals comprising a sequence of video frames is expressed in a digitized form, there is bound to occur a substantial amount of digital data, for each line in a video frame is defined by a sequence of digital data elements referred to as "pixels". Since, however, the available frequency bandwidth of a conventional transmission channel is limited, in order to transmit the substantial amount of digital data through the channel, use of a video signal encoding apparatus may become necessary to compress or reduce the volume of the data to be transmitted.

The digital video signal can be normally compressed without seriously affecting its integrity because there usually exist certain correlationships or redundancies among some of the pixels in a single frame and also among those of neighboring frames. Out of various video compression techniques, so-called hybrid coding techniques, together with statistical coding techniques, are known to be most effective.

Most hybrid coding techniques employ an adaptive intra/non-intra coding, discrete cosine transform(DCT), quantization of transform coefficients, and VLC(variable length coding) as is well known in the art. An input video frame is divided into coding blocks, referred to as macroblocks, with each macroblock typically consisting of 16×16 pixels, and processed as such according to a given hybrid coding scheme. The adaptive intra/non-intra coding is a process of selecting video signals for a subsequent DCT process from either PCM(pulse code modulation) data of a current frame or motion compensated DPCM(differential pulse code modulation) data of a current frame adaptively, i.e., based on the variance thereof.

The non-intra coding technique, which is based on the concept of reducing the redundancies between neighboring frames, is used to predict the current frame according to the motion flow of an object and produce difference signals, referred to as displaced frame difference(DFD) signals, representing the difference between the current frame and its prediction. Normally, the resultant coded data length of the DFD signals is shorter than that of the corresponding intra coding signals.

A scene in a video signal may be divided into two portions: i.e., moving objects; and the stationary background which contains no moving objects. When an object moves within the background of the scene, however, there will be an area which used to be hidden behind the moved object but becomes visible after the moving. Logically, this newly appeared area(hereinafter referred to as "uncovered area") should be coded by using the intra coding technique (and not the non-intra coding method inasmuch as there is no similarity or redundancy relating to the newly appeared portion in the previous frame, which can be used to predict the current frame). Sometimes, however, it happens that the coding mode selecting process purely based on the variance may incorrectly choose the non-intra coding, instead of the intra coding, to encode the newly appeared area.

SUMMARY OF THE INVENTION

It is, therefore, a primary object of the present invention to provide an encoder capable of accurately selecting of the coding mode for a newly appeared portion.

In accordance with one aspect of the present invention, there is provided an encoding apparatus for coding digital video signals describing a scene having at least one moving object and a stationary background, said digital video signals being represented by a series of video frames, each video frame being divided into a plurality of coding blocks, having a capability of adaptively selecting one of an intra coding technique and a non-intra coding technique to be applied to each coding block, which comprises:

uncovered area detecting means for, in responsive to a current frame and the previous and next frames thereof in the digital video signals, detecting an uncovered area representing a portion in the current frame, which used to be hidden behind the moving object in the previous frame but becomes visible after a movement of the moving object between the previous and current frames; and coding mode control means for determining, for each of the coding blocks in the current frame, whether said each of the coding blocks belongs to the uncovered area or not, and applying the intro coding technique to said each of the coding blocks regardless of the adaptively selected coding mode.

BRIEF DESCRIPTION OF THE DRAWINGS

The above and other objects and features of the present invention will become apparent from the following description of preferred embodiment given in conjunction with the accompanying drawings, in which;

FIG. 3 presents a block diagram of an exemplary internal structure of the coding control device 105 shown in FIG. 1; and FIG. 4 represents a block diagram of an exemplary internal structure of the coding mode control switch 115 shown in FIG. 1.

DETAILED DESCRIPTION OF THE PREFERRED EMBODIMENTS

Figure 1:
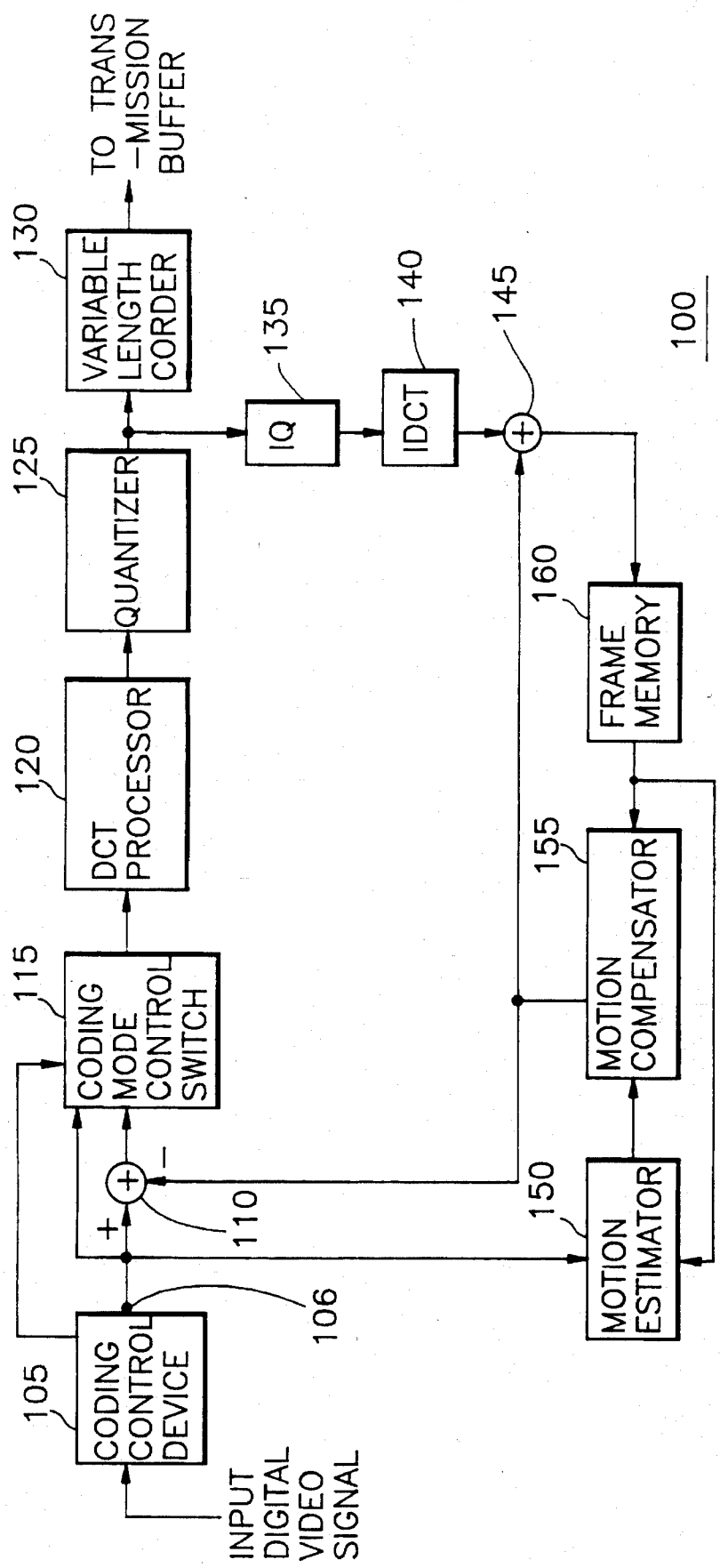
FIG. 1 depicts a block diagram of a video encoder in accordance with the preferred embodiment of the present invention.

Referring to FIG. 1, there is illustrated a block diagram of a video encoder 100 in accordance with the preferred embodiment of the present invention.

As shown in FIG. 1, input video signals comprising a sequence of video frames each of which is, in turn, divided into a plurality of macroblocks, is first fed, on a macroblock-by-macroblock basis, into the video encoder 100 through a coding control device 105. The coding control device 105 then, when given three successive frames, i.e., a current frame and the previous and next frames in the input video signals, detects an uncovered area(s) within the current frame; provides an uncovered area map bearing such detected information for a coding mode control switch 115; and outputs the video signals of the current frame to a motion estimator 150, a signal combiner 110 and the coding mode control switch 115, as will be described more fully hereinbelow.

The motion estimator 150, given the current and the previous frame stored in a frame store 160, predicts the current frame from the previous frame by way of generating a prediction result for each of the macroblocks within the current frame and providing the prediction result for a motion compensator 155.

The signal combiner 110 subtracts a predictive block calculated by the motion compensator 155 based on the prediction result from the motion estimator 150, from each macroblock within the current frame; decides a coding, i.e., intra or non-intra coding, mode for each macroblock based on the variance thereof; and supplies as an output block either the original macroblock(PCM block) or the prediction error block(DPCM block) resulting from the subtraction, to the coding mode control device 115, depending on the decided coding mode.

The coding mode control switch 115 then provides a two-dimensional Discrete Cosine Transformation processor 120 with either the macroblock supplied from the coding control device 105 or the output block from the signal combiner 110 according to the information contained in the uncovered area map from the coding control device 105. Specifically, when the macroblock under consideration within the current frame is determined to belong to an uncovered area(s) according to the information contained in the uncovered area map, acknowledging the macroblock should be coded by the intra coding technique, the coding mode control switch 115 provides the macroblock supplied from the coding control device 105. Otherwise, i.e., when the macroblock does not belong to the uncovered area(s) in the current frame, the coding mode control switch 115 provides the output block from the signal combiner 110. In this case, therefore, the coding mode for the macroblock is maintained as is determined by the signal combiner 110 in a conventional manner.

Each resultant block from the coding mode control switch 115 is then transformed into its spectral components via the two-dimensional DCT processor 120 and supplied via a quantizer 125 as quantized video block to a variable length encoder 130 and then to a transmission buffer(not shown). Also, the inversely quantized and transformed block via an inverse quantizer 135 and an inverse transformer 140 (,added to the predictive block from the motion compensator 155 in case the block has been coded by non-intra coding) are, for a next prediction, supplied to the motion compensator 155 and the motion estimator 150 via a frame memory 160 in the form of a candidate predictive block that is retarded by one frame interval from the current frame now present at an output 106 of the coding control device 105.

Figure 2:
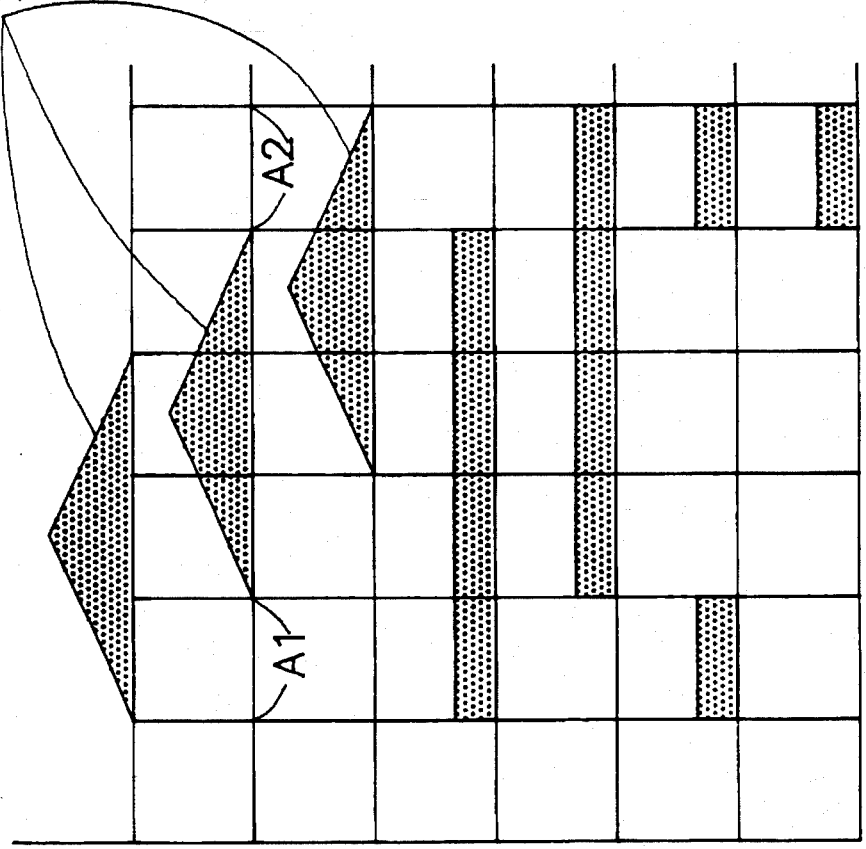
FIG. 2 illustrates a process for detecting an uncovered area(s), performed by the coding control device 105 shown in FIG. 1.

Turning now to FIG. 2, there is illustrated an exemplary process performed by the coding control device 105 of FIG. 1, for detecting an uncovered area(s) in the current frame of the input video signals. (As discussed above, an uncovered area denotes an area which used to be hidden behind a moving object but becomes visible after the moving.)

For the purpose of illustration, we will assume that a moving object 200 has moved laterally from right to left between the previous and current frames, and also between the current and next frames as shown in FIG. 2, wherein reference symbols F(N−1), F(N) and F(N+1) denote the previous, current and next frames, respectively. Further, in FIG. 2, reference symbols A1 and A2 shall denote an uncovered area in the current frame F(N) after the movement of the moving object 200 between the previous and current frames F(N−1) and F(N), and an area covered in the next frame F(N+1) after the movement of an moving object 200 between the current and next frames F(N) and F(N+1), respectively.

In order to detect an uncovered area(s) A2 present in the current, frame differences FD(N−1, N), FD(N, N+1), which have a logic-1 value in an area where there is a change between the two given frames, are obtained between the previous and current frames, and between the current and next frames, respectively, by using a method disclosed in, e.g., Matthias Bierling and Robert Thomas, "Motion Compensated Field Interpolation using Hierarchically Structured Displacement Estimation," *Signal Processing* 11, pp. 387–404 (1986), as shown in FIG. 2.

The two Frame differences FD(N−1, N), FD(N, N+1) are then Exclusive-ORed to exclude the common area between the two frame differences FD(N−1, N) and FD(N, N+1), to thereby obtain two separate areas A1 and A2. Thereafter, to differentiate the uncovered area(s) A2 from the area(s) A1 covered in the next frame, the two separate areas A1 and A2 are ANDed with the frame differences FD(N−1, N), detecting the uncovered area(s) in the current frame F(N) as is required.

Referring to FIG. 3, there is shown a more detailed block diagram of the coding control device 105 shown in FIG. 1, wherein the above described uncovered area detecting process can be carried out.

As shown in FIG. 3, when input video signals (e.g., the video signals of the next frame F(N+1) in FIG. 2) is first fed into a frame delay logic 305 and a frame difference calculator 310 as its one input, the frame delay logic 305 retards the input video signals by one frame interval and supplies the retarded input video signals (e.g., the video signals of the current frame F(N) in FIG. 2) to the frame difference calculator as 310 its another input. The frame difference calculator 310 then performs the above-described frame difference calculation over its two inputs and transfers the resultant frame difference (e.g., the frame difference FD(N, N+1) in FIG. 2) to another frame delay logic 320 and an Exclusive-OR logic 330, respectively. The frame delay logic 320 delays the calculated frame difference by one frame interval, and supplies the delayed frame difference (e.g., the frame difference FD(N−1, N) in FIG. 2) to the Exclusive-OR logic 330 and an AND logic 350. The Exclusive-OR logic 330 performs the Exclusive-OR operation over its two input and supplies the result (e.g., the signal XOR[FD(N−1, N), FD(N, N+1)] shown in FIG. 2) to the AND logic 350. The AND logic 350 performs the AND operation over its two inputs to obtain an uncovered area map (e.g., the signal AND{FD[N−1,N], XOR[FD(N−1,N),FD(N,N+1)]} shown in FIG. 2) for the retarded input video signals (e.g., the current frame F(N) in FIG. 2), as is desired.

Referring now to FIG. 4, there is illustrated a more detailed block diagram of the coding mode control switch 115 of FIG. 1.

As is described above, the coding mode control switch 115 provides a two-dimensional DCT processor 120 shown in FIG. 1 with either a macroblock from the coding control device 105 or an output block from the signal combiner 110 according to the information contained in the uncovered map thereof from the coding control device 105 shown in FIGS. 1 and 3. Specifically, when the macroblock under consideration within the current frame is determined to belong to an uncovered area(s) according to the information contained in the uncovered area map thereof, acknowledging the macroblock should be coded by the intra coding technique regardless of the coding mode decided in the signal combiner 110 for the macroblock, the coding mode control switch 115 provides the macroblock supplied from the coding control device 105.

As shown in FIG. 4, the coding mode control switch includes a coding mode decision device 410, and a mode control switch 420. The coding mode decision device 410 determines, by taking the uncovered area map as its input, whether the macroblock belongs to the uncovered area(s), by, e.g., counting the number of pixels within the macroblock, which belong to the uncovered area(s) in the uncovered map, and determining that the macroblock belongs to the uncovered area(s) when the counted number exceeds a predetermined value; and issues a switching control signal to the mode control switch 420 to select either the macroblock from the coding control device 105 when the macroblock belongs to the uncovered area(s), or the output block from the signal combiner 110, otherwise.

While the present invention has been described with reference to the particular embodiments, it will be apparent to those skilled in the art that various changes and modifications may be made without departing from the spirit and scope of the present invention as defined in the following claims.

What is claimed is:

1. An apparatus for encoding video signals represented by a series of video frames, each of the video frames being divided into a plurality of coding blocks, having a capability of adaptively selecting either an intra coding technique or a non-intra coding technique for its application to each of the coding blocks, which comprises:

means for determining a current frame difference and a next frame difference, wherein the current frame difference represents differences between a current and a preceding frame of the video signals and the next frame difference denotes differences between the current frame and a next frame of the video signals;

means for XORing the current frame difference and the next frame difference, to provide a transition region consisting of a covered region and an uncovered region;

means for selecting the uncovered region from the transition region using the current frame difference; and coding control means for applying the intra coding technique to the coding blocks included in the uncovered region.

* * * * *